United States Patent
Ring et al.

(10) Patent No.: US 8,807,971 B2
(45) Date of Patent: Aug. 19, 2014

(54) TURBO COMPRESSOR AND COMPRESSOR SYSTEM COMPRISING SUCH A TURBO COMPRESSOR

(75) Inventors: Hans-Joachim Ring, Gieboldehausen (DE); Joel Kofi Adomako, Moringen (DE)

(73) Assignee: Piller Industrieventilatoren GmbH, Moringen (DE)

( * ) Notice: Subject to any disclaimer, the term of this patent is extended or adjusted under 35 U.S.C. 154(b) by 9 days.

(21) Appl. No.: 13/523,455

(22) Filed: Jun. 14, 2012

(65) Prior Publication Data

US 2013/0058804 A1 Mar. 7, 2013

Related U.S. Application Data (63) Continuation of application No. PCT/EP2010/069316, filed on Dec. 9, 2010.

(30) Foreign Application Priority Data

Dec. 16, 2009 (DE) .......................... 10 2009 054 773

(51) Int. Cl.
*F04D 29/58* (2006.01)
(52) U.S. Cl.
USPC ...................................................... 417/423.8
(58) Field of Classification Search
USPC .................. 417/300, 301, 306, 423.7, 423.8; 415/115
See application file for complete search history.

(56) References Cited

U.S. PATENT DOCUMENTS

| | | | |
|---|---|---|---|
| 3,149,819 A | 9/1964 | Baumann et al. | |
| 5,983,888 A | 11/1999 | Anselmino et al. | |
| 6,087,744 A | 7/2000 | Glauning | |
| 7,604,463 B2 * | 10/2009 | Gatley et al. | 417/423.9 |
| 2009/0028730 A1 * | 1/2009 | Radermacher et al. | 417/423.8 |
| 2010/0263964 A1 | 10/2010 | Kosaka et al. | |

FOREIGN PATENT DOCUMENTS

| | | |
|---|---|---|
| AT | 502338 A1 | 3/2007 |
| AT | 502566 A1 | 4/2007 |
| DE | 528 898 | 6/1931 |
| DE | K 18923 | 7/1953 |
| DE | 69708850 T2 | 7/2002 |
| DE | 102005025857 A1 | 12/2006 |
| EP | 0 883 749 A1 | 8/1997 |
| EP | 0 962 636 A2 | 12/1999 |
| EP | 1 662 149 A1 | 5/2006 |
| EP | 2 192 289 A1 | 6/2010 |
| GB | 1 534 745 | 12/1978 |
| WO | WO 2006/131470 A2 | 12/2006 |
| WO | WO 2007/110281 A1 | 10/2007 |
| WO | WO 2009/034629 A1 | 3/2009 |

* cited by examiner

*Primary Examiner* — Bryan Lettman
(74) *Attorney, Agent, or Firm* — Reinhart Boerner Van Deuren P.C.

(57) ABSTRACT

A turbo compressor for air includes a compressor housing and an impeller arranged in the compressor housing. The turbo compressor also has a drive motor with a stator and a rotor. On the rotor shaft of which the impeller is seated, in such a manner that the drive motor is cooled in an optimum manner, the drive motor is positioned to be cooled with a flow of cooling air by way of a closed cooling air circuit. The flow of cooling air in the cooling air circuit flows through at least one cooling bore which penetrates a section of the rotor shaft.

18 Claims, 8 Drawing Sheets

TURBO COMPRESSOR AND COMPRESSOR SYSTEM COMPRISING SUCH A TURBO COMPRESSOR

This application is a continuation of International application No. PCT/EP2010/069316 filed on Dec. 9, 2010.

This patent application claims the benefit of international application No. PCT/EP2010/069316 of Dec. 9, 2010 and German application No. 10 2009 054 773.8 of Dec. 16, 2009, the teachings and disclosure of which are hereby incorporated in their entirety by reference thereto.

The invention relates to a turbo compressor for air, comprising a compressor housing and an impeller arranged in the compressor housing as well as a drive motor with a stator and a rotor, on the rotor shaft of which the impeller is seated.

Turbo compressors of this type are known from the state of the art.

In their case, cooling of the drive motor is normally brought about in that a flow of cooling air is blown through it.

As a result, the drive motor is, however, burdened with dust to a considerable degree and, on the other hand, there is the problem that undesired pollutants will be carried into the drive motor and the surroundings.

The object underling the invention is, therefore, to improve a turbo compressor of the generic type in such a manner that the drive motor is cooled in an optimum way.

This object is accomplished in accordance with the invention, in a turbo compressor of the generic type, in that the drive motor is cooled with a flow of cooling air by way of a closed cooling air circuit and the flow of cooling air in the cooling air circuit flows through at least one cooling bore which penetrates a section of the rotor shaft.

The rotor may be cooled in a simple and efficient manner with such a cooling bore and, on the other hand, the flow of cooling air can also be favorably conveyed in the cooling air circuit.

In principle, the cooling bore could pass through the rotor shaft at different locations. One particularly favorable solution provides for the cooling bore to be a central bore of the rotor shaft.

In order to cool the rotor as efficiently as possible, it is expediently provided for the cooling bore to pass through at least one section of the rotor shaft, which bears the rotor, in the direction of a rotor axis.

In addition, no further details have been given concerning the supply of the flow of cooling air to the rotor shaft. In principle, it would be conceivable to supply the flow of cooling air to the rotor shaft radially at various locations.

It is, however, particularly favorable when the rotor shaft has an entry opening for the flow of cooling air at an end facing away from the impeller.

Particularly when such an entry opening at an end facing away from the impeller is used and the opening may be arranged, in particular, coaxially to the rotor axis, a favorable conveyance of the cooling air is possible.

One particularly advantageous solution provides for the cooling bore to extend through the rotor shaft, proceeding from the entry opening, as far as a branch area, from which at least one conveyor duct extends which runs in a radial direction to the rotor axis with at least one component.

Such a conveyor duct creates the possibility of exerting a conveying effect on the flow of cooling air as a result of the rotating rotor shaft since the flow of cooling air is conveyed through the cooling bore when the rotor shaft is rotating as a result of the radial acceleration in the conveyor duct.

It is even more efficient when several conveyor ducts extend away from the branch area.

With respect to the course of the at least one conveyor duct relative to the cooling bore, no further details have so far been given.

It is particularly favorable when the at least one conveyor duct has a duct exit opening which is located radially outwards with respect to the cooling bore and from which the flow of cooling air exits following acceleration in the conveyor duct.

In principle, the duct exit opening could be arranged at any optional position of the rotor shaft so as to be located radially outwards with respect to the cooling bore.

One solution which is particularly efficient for the cooling effect provides for the at least one duct exit opening to be arranged so as to face an underside of the impeller which faces away from impeller blades of the impeller.

This means that the flow of cooling air which exits from the duct exit openings flows in the direction of the underside of the impeller and, therefore, is also in a position to cool the underside of the impeller.

A particularly favorable cooling of the impeller is possible when the flow of cooling air conveyed in the cooling circuit flows on the underside of the impeller in a radial direction to the rotor axis from an area located radially inwards to an area of the underside of the impeller located radially outwards.

As a result, an efficient cooling of the impeller, as well, is possible in the region of its underside by means of the flow of cooling air.

In order to obtain as comprehensive a cooling effect as possible in the region of the underside of the impeller, it is preferably provided for the area of the underside of the impeller located radially outwards to be formed by an annular area which extends from an outer side of the impeller over at the most one fifth of the radius thereof.

In order to be able to convey the flow of cooing air in the cooling circuit in an optimum manner, it is preferably provided for the flow of cooling air to flow through a gap between the underside of the impeller and a base plate of the compressor housing which faces it so that the flow of cooling air is also conveyed in an optimum manner in the region of the underside of the impeller.

In order to be able to take up the flow of cooling air again once the underside of the impeller has been cooled, it is preferably provided for the flow of cooling air to enter receiving openings in the base plate of the compressor housing, which are arranged around the rotor shaft, when it reaches the area of the impeller located radially outwards and to flow through ducts into a collecting duct. As a result, the flow of cooling air may be taken up by the compressor housing in an optimum manner following cooling of the underside of the impeller.

With respect to the course of the collecting duct, no further details have so far been given. One particularly favorable solution provides, for example, for the collecting duct to be located radially outside of the receiving openings so that the flow of cooling air can still continue to flow in the ducts radially to the rotor shaft as far as the collecting duct.

Furthermore, the collecting duct could extend in the base plate of the compressor housing in any optional manner. It is particularly favorable when the collecting duct is arranged in the base plate of the compressor housing so as to extend radially around the rotor shaft.

With respect to the further conveyance of the flow of cooling air after cooling of the underside of the impeller, no further details have been given in conjunction with the preceding explanations concerning the individual embodiments.

One particularly favorable solution, for example, provides for the collecting duct to be connected to a line, from which the flow of cooling air is conveyed to a cooling unit. As a result, it is possible to cool the flow of cooling air in a defined manner following cooling of the underside of the impeller.

A further, favorable solution provides for the flow of cooling air to be cooled in the cooling unit and then conveyed to the rotor shaft again.

With respect to the cooling unit for the flow of cooling air, no further details have so far been given. For example, the flow of cooling air could pass through a heat exchanger which, for its part, is cooled, for example, by ambient air.

It is particularly favorable when the cooling unit is designed as a fluid cooler for the flow of cooling air since an efficient cooling of the flow of cooling air can be carried out with a fluid cooler in a compact manner.

With respect to the conveyance of the flow of cooling air, it is particularly favorable when the flow of cooling air leaving the cooling unit is conveyed to the entry opening of the rotor shaft and, therefore, enters the rotor shaft in order to cool the rotor.

With respect to the design of the cooling unit, no further details have so far been given. One advantageous solution, for example, provides for the cooling unit to be designed as a fluid cooler.

In this respect, it is particularly favorable when the fluid cooler is arranged in a fluid cooling circuit for the stator of the drive motor.

With respect to the cooling of the stator of the drive motor, no further details have likewise been given. One particularly favorable solution provides for the fluid cooling circuit to cool the stator of the drive motor on the circumferential side.

The fluid cooling circuit could, for example, be cooled by an external cooling device. One particularly favorable solution provides for a heat exchanger and a cooling blower to be arranged in the fluid circuit so that the fluid cooling circuit can be cooled by the heat exchanger and the cooling blower by way of ambient air.

In addition, the invention relates to a compressor system for air which has, in accordance with the invention, a turbo compressor arranged in a system housing as well as an intake module which is arranged in the system housing and through which the turbo compressor draws in an intake volume flow.

One particularly favorable solution provides for a sound absorber unit to be arranged in the intake module.

In this respect, the sound absorber unit is preferably designed such that it has sound absorber connecting links which act on the intake volume flow in a sound absorbing manner.

In particular, the sound absorber connecting links have connecting link walls which are arranged at a distance from one another, are provided with sound insulating layers and bring about the sound absorption.

For example, the connecting link walls are arranged such that they extend parallel to one another.

Furthermore, it is favorable for the sound insulation when the sound absorber unit has flow channels which extend between the sound absorber connecting links and through which the intake volume flow can flow.

Preferably, several flow channels are provided which can have the intake volume flow flowing through them.

One particularly favorable embodiment of the compressor system according to the invention provides for the sound absorber unit to be arranged between an entry opening for external air and an intake chamber for the turbo compressor.

Furthermore, an intake filter, which serves to filter the intake volume flow, is preferably arranged between the intake chamber and an intake inlet of the turbo compressor.

Since a turbo compressor according to the invention, when starting up, normally works in bypass operation, a bypass sound absorber is preferably arranged in the intake module and this absorbs sound in a bypass volume flow conveyed back from a bypass connection of the turbo compressor to the intake inlet of the turbo compressor.

For this purpose, not only is the sound absorbed but it is preferably provided for the bypass sound absorber to expand the bypass volume flow in order to reduce the flow velocity in the bypass volume flow.

In this respect, the bypass volume flow is preferably conveyed to the intake chamber of the intake module so that it is mixed in the intake chamber with the intake volume flow which passes through the sound absorber.

The bypass sound absorber is expediently designed such that it supplies the bypass volume flow to the intake chamber of the intake module.

In this respect, the bypass sound absorber is designed, in particular, such that it has an inflow channel which leads from a compressor connection side of the intake module to a side of the intake module located opposite thereto.

Furthermore, an expansion chamber for the bypass volume flow is preferably arranged on a side of the intake module which is located opposite the compressor connection side of the turbo compressor.

In this respect, it is preferably provided for the bypass volume flow to enter the intake chamber between the sound absorber unit and the intake filter from the expansion chamber.

With respect to the design of the bypass sound absorber, no further details have so far been given.

In order to obtain an optimum sound absorption in the region of the bypass sound absorber, as well, it is provided for the bypass sound absorber to have walls provided with sound insulating layers.

Furthermore, it is provided for the purpose of securing the sound insulating layers for them to have their surfaces secured by a grating element on the side of the walls facing the bypass volume flow so that the bypass volume flow which flows with a high flow velocity does not damage the sound insulating layers on their surfaces.

Additional features and advantages of the invention are the subject matter of the following description as well as the drawings illustrating several embodiments. In the drawings.

Figure 1:
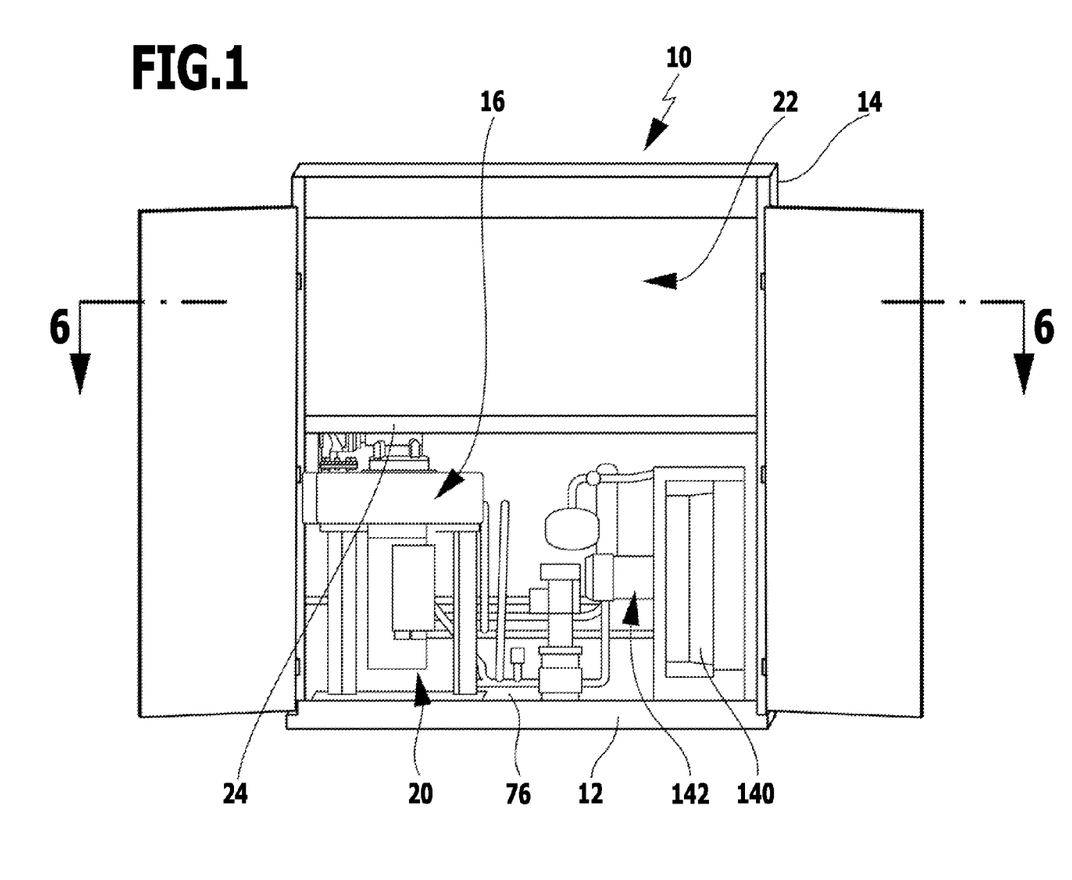
FIG. 1 shows a side view of a compressor system according to the invention with opened doors of a system housing.

One embodiment of a compressor system according to the invention, illustrated in FIG. 1, comprises a system housing which is designated as a whole as 10 and comprises a housing shell 14 which rises above a housing base 12.

A holding unit 16, which accommodates a turbo compressor designated as a whole as 20, is seated on the housing base 12.

The turbo compressor 20 serves to compress air which it takes in via an intake module 22 which is connected to the compressor 20 with a compressor connection side 24 and will be described in detail in the following.

Figure 2:
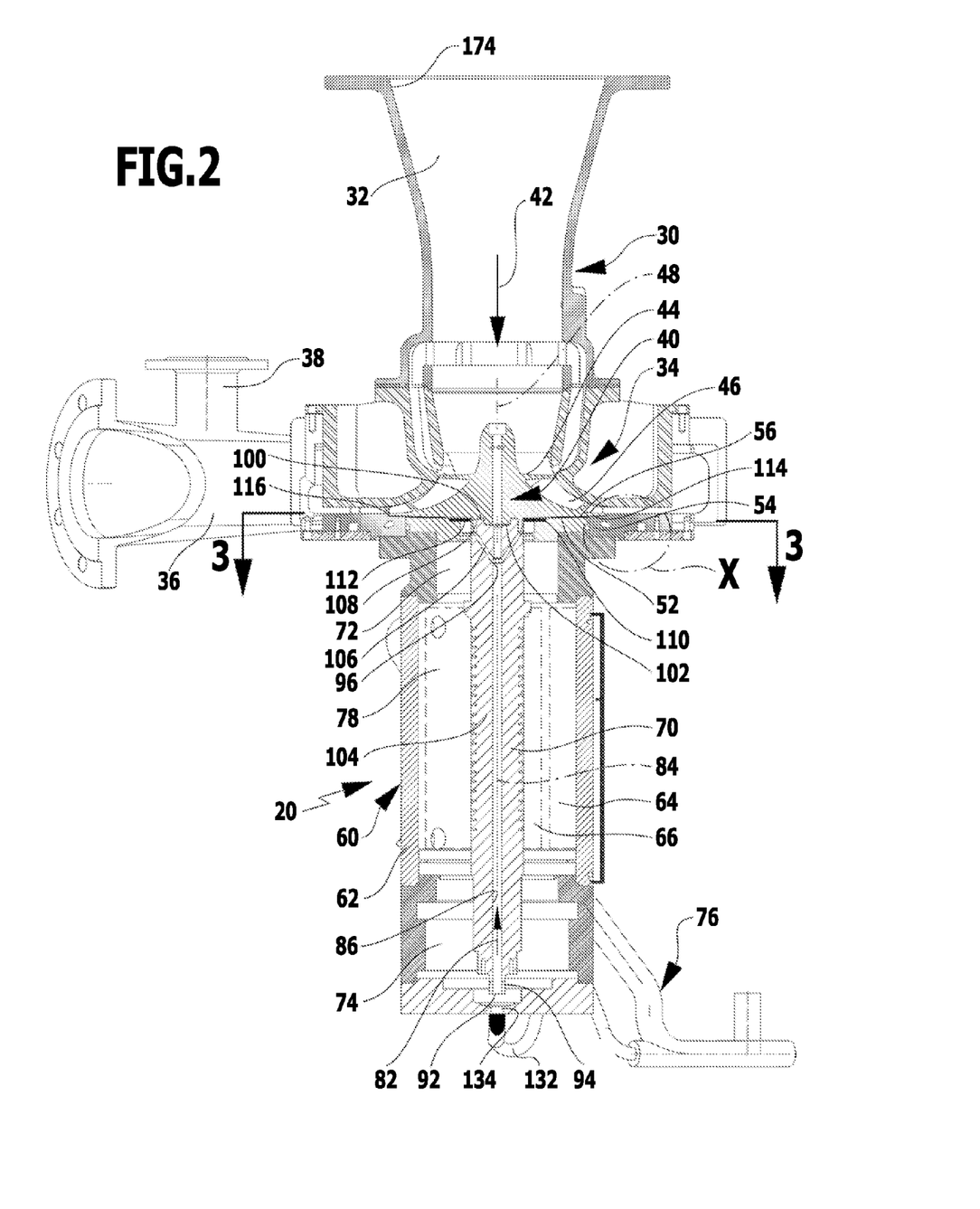
FIG. 2 shows a longitudinal section through a turbo compressor according to the invention.

As illustrated in FIG. 2, the turbo compressor 20 comprises a compressor housing which is designated as a whole as 30 and comprises a compressor inlet 32, an impeller housing 34 as well as a compressor outlet 36, wherein a bypass branch 38 is provided in the compressor outlet 36.

An impeller, which is designated as a whole as 40, is provided in the impeller housing 34 and this bears on a front side 44 of the impeller, which faces a compressor volume flow 42 and acts on it, impeller blades 48 which accelerate the compressor volume flow 42 radially to an impeller axis 48 in conjunction with the impeller housing 34 and supply it to the compressor outlet 46 as a compressed volume flow.

An impeller underside 52 of the impeller 40 faces a base plate 54 of the compressor housing and moves at a slight distance above an upper side 56 of the compressor housing base plate 54 which faces the underside 52 of the impeller.

A drive motor 60, which is designated as a whole as 60, is provided for driving the impeller 40 and this drive motor has a motor housing 62 which is connected to the compressor housing 30 and in which, on the one hand, a stator 64 is arranged and within the stator 64 a rotor 66 which, for its part, is seated on a rotor shaft designated as a whole as 70.

The rotor shaft 70 is mounted for rotation in the motor housing 62, on the one hand, with a rotary bearing unit 72 on a side facing the impeller 40 and, on the other hand, with a rotary bearing unit 74 on a side facing away from the impeller, wherein the rotary bearings 72 and 74 comprise, on the one hand, magnetic bearings and, on the other hand, mechanical safety bearings.

The cooling of the stator 64 is brought about via a fluid cooling circuit 76 by means of a cooling jacket 78 of the stator 64 while cooling of the rotor 66 is brought about via a flow of cooling air 82 which is conveyed in a cooling air circuit 80.

For the direct cooling of the rotor 66, the rotor shaft 70 is provided with a central bore 86 which extends coaxially to a rotor axis 84 from an entry opening 92 for the flow of cooling air 82, which is arranged coaxially to the rotor axis 84 at an end 94 of the rotor shaft 76 located opposite the impeller 40, as far as a branch area 96 which is arranged close to an impeller receptacle 100 of the rotor shaft 70, wherein the impeller 40 is seated in the impeller receptacle 100 with an impeller projection 102 and is held in it.

The branch area 96 is preferably located in the region of the rotary bearing unit 72 which faces the impeller 40 and so the central bore 86 passes through the entire rotor section 104 of the rotor shaft 70 which bears the rotor 66 and, therefore, cools the rotor 66 substantially over its entire length.

Proceeding from the branch area 96, conveyor ducts 106 extend in the direction of an outer side of the rotor shaft 70 with a component radial to the rotor axis 84, wherein a conveying effect on the flow of cooling air 82 results in these conveyor ducts 106, when the rotor shaft 70 rotates, as a result of acceleration of the air in a radial direction to the rotor axis 84.

Figure 4:
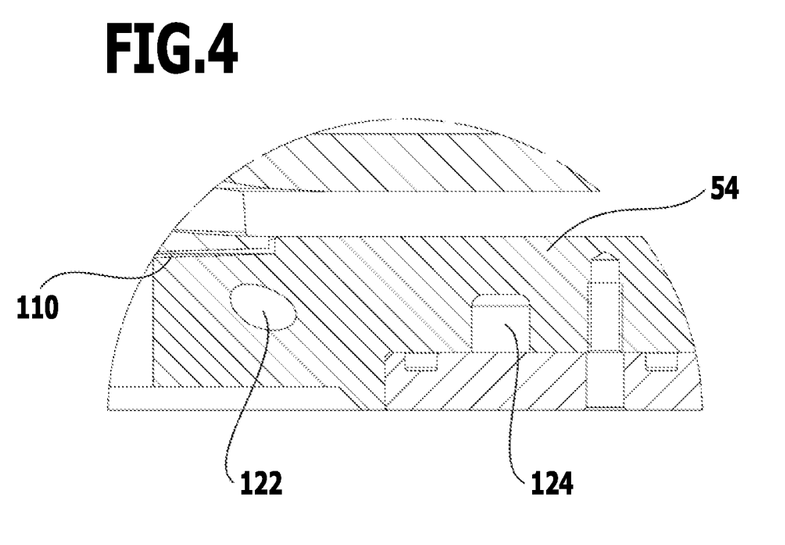
FIG. 4 shows a detailed section through an area X in FIG. 2.

The conveyor ducts 106 extend in the rotor shaft 70 such that they open close to the underside 52 of the impeller with duct exit openings 108 and allow the flow of cooling air 82 to enter a gap 110 which is formed between the upper side 56 of the base plate 54 of the compressor housing and the underside 52 of the impeller and in which the flow of cooling air 82 moves outwardly radially to the rotor axis 84 and thereby cools the impeller 40 on the underside 52 of the impeller as well as the base plate 54 of the compressor housing on the upper side 56.

The duct exit openings 108 are located in the region of the impeller receptacle 100 and so the flow of cooling air flows in the gap 110 proceeding from an area 112, which is located radially inwards and surrounds the impeller projection 102, as far as an area 114, which is located radially outwards and close to an outer side 116 of the impeller 40.

Figure 3:
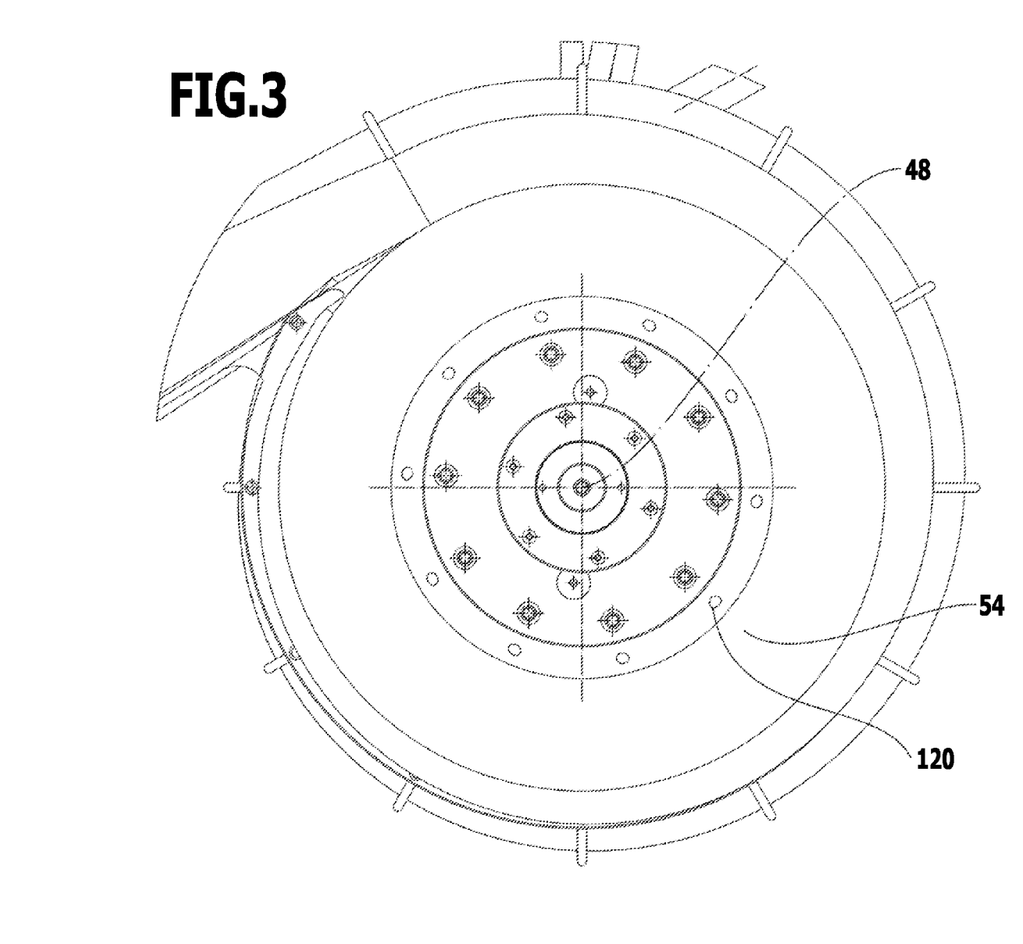
FIG. 3 shows a section along line 3-3 in FIG. 2.

As illustrated in FIG. 3, receiving openings 120 are provided in the base plate 54 of the compressor housing around the impeller axis 48 and they receive the flow of cooling air 82 propagating in the gap 110 radially to the impeller axis 48 and convey it through ducts 122 in the base plate 54 of the compressor housing, which extend with a component in a radial direction relative to the rotor axis 84, to a collecting duct 124, which is arranged radially to the rotor axis 84 and offset outwardly relative to the receiving openings 120 and in which the entire flow of cooling air 82 collects around the rotor axis 84 and is supplied to a cooling unit 130 via a hose 126.

Figure 5:
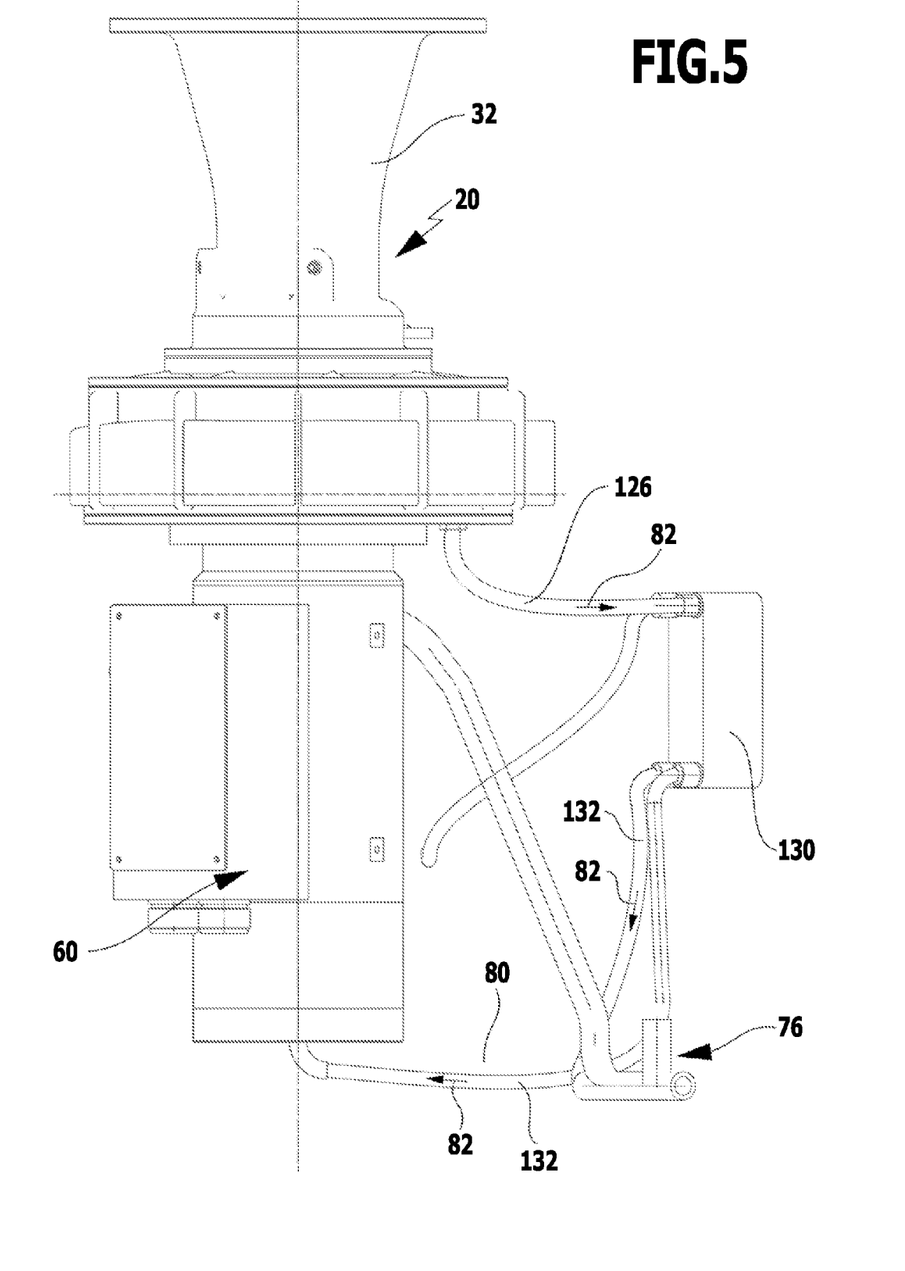
FIG. 5 shows a side view of the turbo compressor with a cooling unit associated with it.

The cooling unit 130 cools the flow of cooling air 82 and conveys it to a hose 132 which, for its part, allows the flow of cooling air 82 to exit from an opening 134 which faces the entry opening 92 of the central bore 86 in the rotor shaft 70 so that the flow of cooling air 82 can enter the central bore 86 of the rotor shaft 70 directly in order to flow through it.

As already mentioned, the flow of cooling air 82 is conveyed in the entire cooling air circuit 80 merely through the conveyor ducts 106 in the rotor shaft 70 which extend radially to the central bore 86, wherein the cooling air circuit 80 is an essentially closed cooling air circuit 80 which has the advantage that the cooling air does not experience any soiling, on the one hand, and, on the other hand, can be cooled and circulated in a targeted manner.

The cooling unit 70 for the flow of cooling air 82 is designed as a heat exchanger which is arranged in the fluid cooling circuit 76 and, therefore, cooled by fluid in order, for its part, to cool the flow of cooling air 82.

Furthermore, a heat exchanger 140 is also provided in the fluid cooling circuit 76 and this can be cooled by a blower designated as a whole as 142 by way of external air so that cooling of the fluid in the fluid cooling circuit 76 can take place in the heat exchanger 140.

As illustrated in FIG. 1, both the heat exchanger 140 and the blower 142 are arranged on the housing base 12 beneath the intake module 22 and within the housing shell 14.

Figure 6:
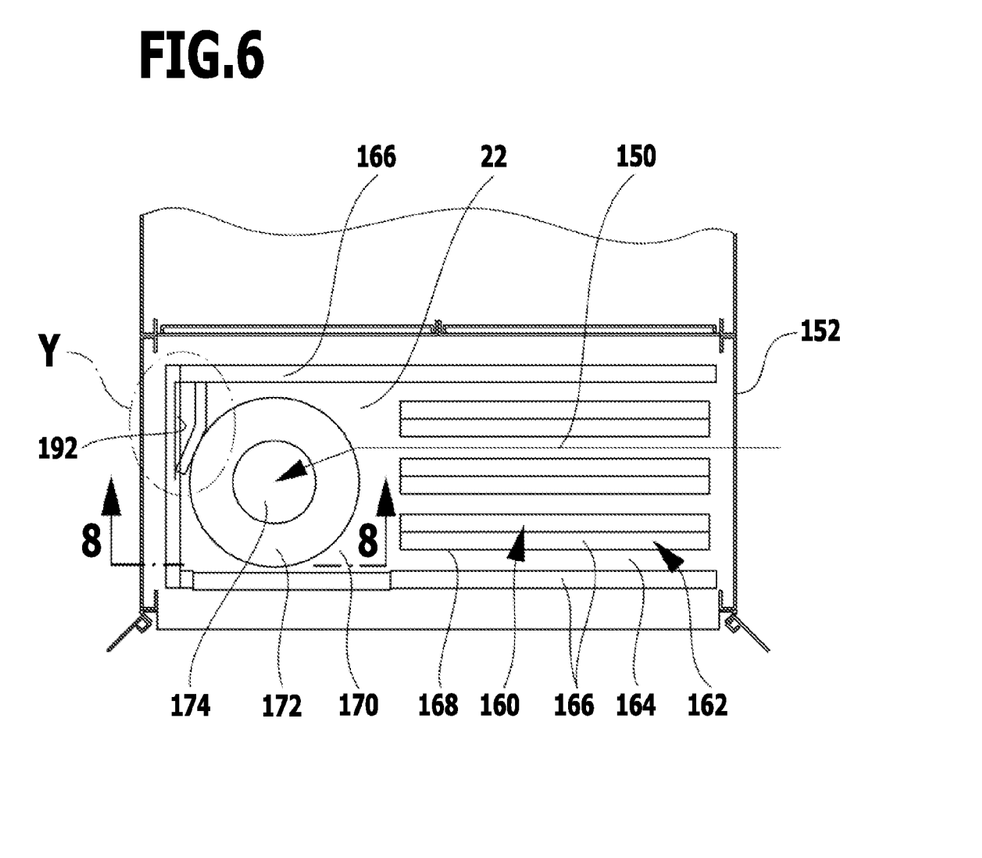
FIG. 6 shows a section along line 6-6 in FIG. 1.

As illustrated in FIGS. 1 and 6, the intake module 22 is arranged above the turbo compressor 20, wherein the intake module 22 has an intake volume flow 150 flowing through it and this enters the intake module through an entry opening 152 for external air, which is arranged in the housing shell 14, passes first of all through a sound absorber unit provided in the intake module 22, then enters an intake chamber 170 and from there passes through an intake filter 172 and then enters an intake inlet 174 of the compressor inlet 32.

The sound absorber unit 160 is designed such that it has sound absorber connecting links 162 which are arranged parallel to one another and limit flow channels 164 extending between them, wherein the sound absorber connecting links 162 limit the flow channels 164 by way of connecting link walls 168 which are provided with sound insulating layers 166 and absorb sound propagating along the flow channels 164 in the direction of the entry opening 152.

As a result, sounds generated by the turbo compressor 20 in the direction of the entry opening 152 are absorbed.

In addition, walls limiting the intake chamber 170 are likewise provided with sound insulating layers 166 so that the entire intake module 22 acts in a sound insulating manner.

Figure 7:
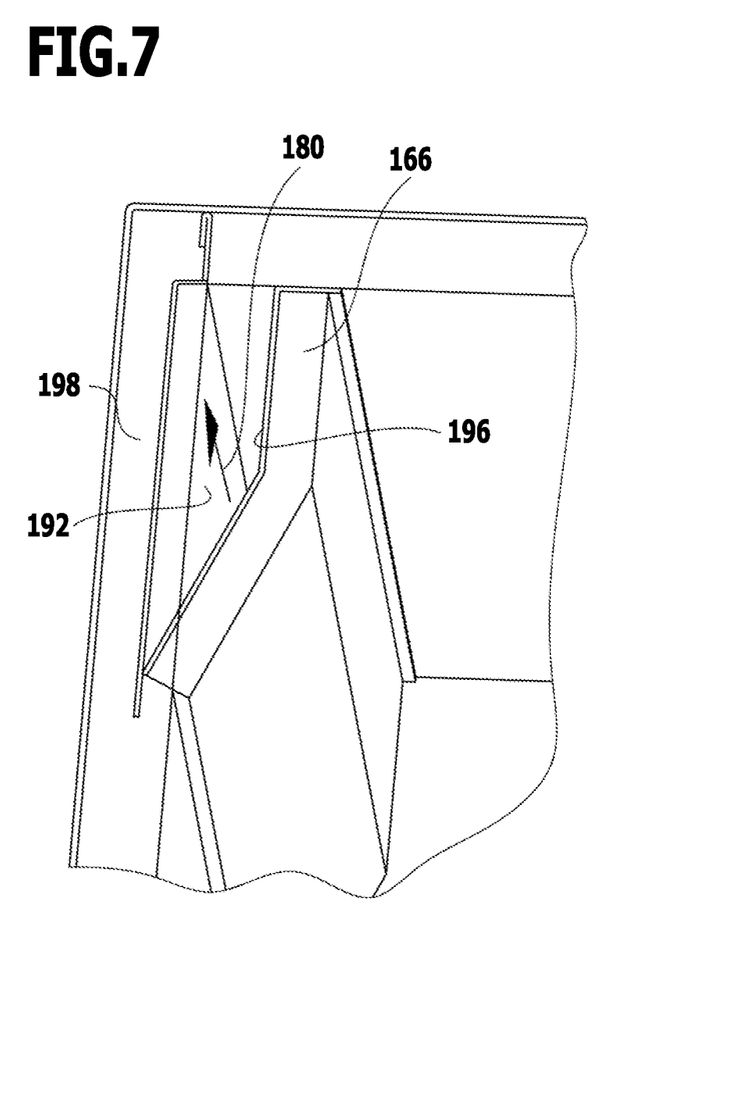
FIG. 7 shows a detailed, enlarged illustration of an area Y in FIG. 6.
Figure 8:
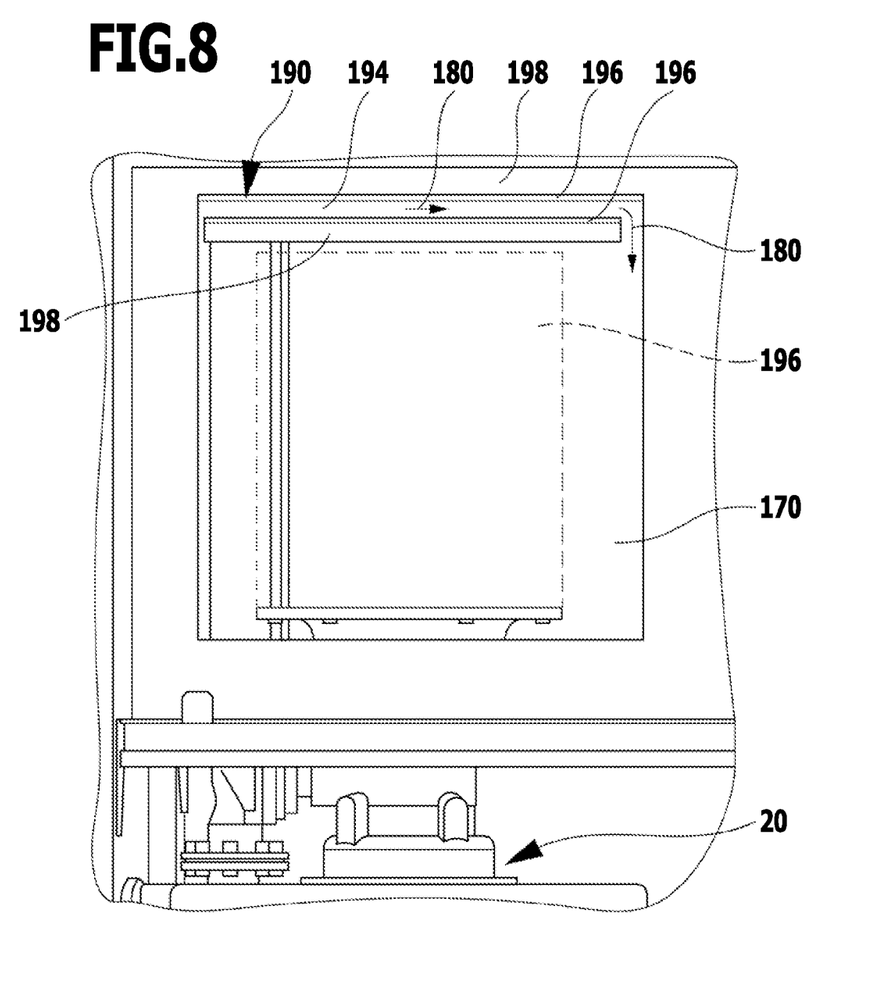
FIG. 8 shows a partial section along line 8-8 in FIG. 6.

Since the turbo compressor 20 according to the invention is operated during the start-up phase with a bypass volume flow 180 which is discharged from the bypass branch 38 in the compressor outlet 36 and this bypass volume flow 180 also generates considerable noise, a bypass sound absorber 190 is also integrated into the intake module, as described in FIGS. 6 to 8.

The bypass sound absorber 190 comprises an inflow channel 192 which takes up the bypass volume flow 180 essentially immediately following the bypass branch 38 and conveys it into an expansion chamber 194 which is preferably arranged on a side of the intake module 22 located opposite the intake inlet 174 and which reduces the flow velocity of the bypass volume flow 180 by expanding it and then allows the bypass volume flow 180 to enter the intake chamber 170.

In this respect, the bypass sound absorber 190 is likewise designed such that its walls 198 are provided with sound insulating layers 166; since, however, considerable flow velocities of the bypass volume flow 180 occur in the inflow channel 192 as well as in the expansion chamber 194, the sound insulating layers 166 have their surfaces secured by a grating element 196 on their upper side facing the bypass volume flow and so the bypass volume flow 180 which is flowing with the high flow velocity cannot damage the surfaces of the sound insulating layers 166 in the region of the bypass sound absorber 190.

The invention claimed is:

1. A turbo compressor for air, comprising a compressor housing and an impeller arranged in the compressor housing as well as a drive motor with a stator and a rotor, the impeller being seated on a rotor shaft, the drive motor being cooled with a flow of cooling air by way of a closed cooling air circuit and the flow of cooling air in the cooling air circuit flows through at least one cooling bore penetrating a section of the rotor shaft, the flow of cooling air conveyed in the cooling air circuit flowing on an impeller underside in a radial direction to the rotor axis from an area located radially inwards to an area of the impeller underside located radially outwards, the flow of cooling air flowing through a gap between the impeller underside and a compressor housing base plate of the compressor housing facing it, wherein when reaching the area of the impeller located radially outwards the flow of cooling air enters receiving openings in the compressor housing base plate arranged around the rotor shaft and flows through ducts into a collecting duct.

2. The turbo compressor as defined in claim 1, wherein the cooling bore is a central bore of the rotor shaft.

3. The turbo compressor as defined in claim 1, wherein the cooling bore passes through at least one section of the rotor shaft bearing the rotor in the direction of a rotor axis.

4. The turbo compressor as defined in claim 1, wherein the rotor shaft has an entry opening for the flow of cooling air at an end facing away from the impeller, proceeding from the entry opening the cooling bore extends through the rotor shaft as far as a branch area, at least one conveyor duct extending from said branch area in a radial direction to the rotor axis with at least one component, the at least one conveyor duct having a duct exit opening located radially outwards with respect to the cooling bore.

5. The turbo compressor as defined in claim 1, wherein the area of the impeller underside located radially outwards is formed by an annular area extending from an outer side of the impeller over at the most one fifth of the radius thereof.

6. The turbo compressor as defined in claim 1, wherein the collecting duct is located radially outside of the receiving openings.

7. The turbo compressor as defined in claim 1, wherein the collecting duct is arranged in the compressor housing base plate so as to extend radially around the rotor shaft.

8. The turbo compressor as defined in claim 1, characterized in that the collecting duct is connected to a line, the flow of cooling air being conveyed from said line to a cooling unit.

9. The turbo compressor as defined in claim 8, wherein the flow of cooling air is adapted to be cooled in the cooling unit and then conveyed to the rotor shaft again.

10. The turbo compressor as defined in claim 9, wherein the flow of cooling air leaving the cooling unit is conveyed to an entry opening of the rotor shaft.

11. The turbo compressor as defined in claim 8, wherein the cooling unit is designed as a fluid cooler for the flow of cooling air.

12. The turbo compressor as defined in claim 8, wherein the cooling unit is designed as a fluid cooler arranged in a fluid cooling circuit.

13. The turbo compressor as defined in claim 12, wherein the fluid cooler is arranged in a fluid cooling circuit for the stator of the drive motor.

14. The turbo compressor as defined in claim 13, wherein the fluid cooling circuit cools the stator of the drive motor on the circumferential side.

15. The turbo compressor as defined in claim 13, wherein a heat exchanger and a cooling blower are arranged in the fluid cooling circuit.

16. A turbo compressor for air, comprising a compressor housing and an impeller arranged in the compressor housing as well as a drive motor with a stator and a rotor, the impeller being seated on a rotor shaft, the drive motor being cooled with a flow of cooling air by way of a closed cooling air circuit and the flow of cooling air in the cooling air circuit flows through at least one cooling bore penetrating a section of the rotor shaft, the flow of cooling air conveyed in the cooling air circuit flowing on an impeller underside in a radial direction to the rotor axis from an area located radially inwards to an area of the impeller underside located radially outwards, the flow of cooling air flowing through a gap between the impeller underside and a compressor housing base plate of the compressor housing facing it, wherein the at least one duct exit opening is arranged so as to face an impeller underside facing away from impeller blades.

17. A compressor system for air, the compressor system having a turbo compressor comprising a compressor housing and an impeller arranged in the compressor housing as well as a drive motor with a stator and a rotor, the impeller being seated on a rotor shaft, the drive motor being cooled with a flow of cooling air by way of a closed cooling air circuit and the flow of cooling air in the cooling air circuit flows through at least one cooling bore penetrating a section of the rotor shaft, the flow of cooling air conveyed in the cooling air circuit flowing on an impeller underside in a radial direction to the rotor axis from an area located radially inwards to an area of the impeller underside located radially outwards, the flow of cooling air flowing through a gap between the impeller underside and a compressor housing base plate of the compressor housing facing it, the turbo compressor arranged in a system housing as well as an intake module arranged in the system housing, said intake module comprising a sound absorber unit the turbo compressor drawing in an intake volume flow through said intake module, wherein the intake module comprises a bypass sound absorber that absorbs sound in a bypass volume flow conveyed back to the intake inlet of the turbo compressor from a bypass connection.

18. The compressor system as defined in claim 17, wherein the sound absorber unit is arranged between an entry opening for external air and an intake chamber for the turbo compressor.

* * * * *

UNITED STATES PATENT AND TRADEMARK OFFICE
CERTIFICATE OF CORRECTION

PATENT NO. : 8,807,971 B2  
APPLICATION NO. : 13/523455  
DATED : August 19, 2014  
INVENTOR(S) : Hans-Joachim Ring et al.

Page 1 of 1

It is certified that error appears in the above-identified patent and that said Letters Patent is hereby corrected as shown below:

In the Claims

Column 8, Line 38, Claim 16, after --the-- insert --rotor shaft has an entry opening for the flow of cooling air at an end facing away from the impeller, proceeding from the entry opening the cooling bore extends through the rotor shaft as far as a branch area, at least one conveyor duct extending from said branch area in a radial direction to the rotor axis with at least one component, the at least one conveyor duct having a duct exit opening located radially outwards with respect to the cooling bore, wherein the--.

Signed and Sealed this  
Thirteenth Day of January, 2015

Michelle K. Lee  
*Deputy Director of the United States Patent and Trademark Office*